US007995188B2

(12) United States Patent
Ferran et al.

(10) Patent No.: US 7,995,188 B2
(45) Date of Patent: Aug. 9, 2011

(54) METHOD OF ESTIMATING A DISTANCE

(75) Inventors: Jordi Ferran, Cerdanyola del Valles (ES); Xavier Soler, Barcelona (ES); Ramon Vega, Sabadell (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 11/995,651

(22) PCT Filed: Jul. 15, 2005

(86) PCT No.: PCT/EP2005/053410

§ 371 (c)(1), (2), (4) Date: Jul. 21, 2008

(87) PCT Pub. No.: WO2007/009490

PCT Pub. Date: Jan. 25, 2007

(65) Prior Publication Data

US 2009/0142082 A1 Jun. 4, 2009

(51) Int. Cl.
*G01C 3/00* (2006.01)

(52) U.S. Cl. .......................................................... 356/3

(58) Field of Classification Search ...... 356/3, 406–408, 356/420, 425, 430, 431; 250/226
See application file for complete search history.

(56) References Cited

U.S. PATENT DOCUMENTS

| | | | | |
|---|---|---|---|---|
| 4,822,170 | A * | 4/1989 | Bonnefoy et al. | 356/614 |
| 6,147,761 | A * | 11/2000 | Walowit et al. | 356/425 |
| 2004/0080553 | A1 | 4/2004 | Kim | |
| 2004/0135087 | A1 | 7/2004 | Martenson | |
| 2005/0110822 | A1 | 5/2005 | Hwang | |

* cited by examiner

*Primary Examiner* — Tu T Nguyen

(57) ABSTRACT

The invention relates to a method of estimating a distance to a surface, whereby an emitter emits light towards a surface, at least some light being reflected by the surface, the surface comprising a detectable feature, the reflected light being received by a first receptor and by a second receptor, the surface being in movement relative to the receptors, the first and the second receptor receiving the light reflected at a first and at a respectively second angle thereby producing a first and a respectively second dataset, each dataset including data representing said feature, the first and the second angle being different, whereby the distance is estimated using the first and the second dataset.

17 Claims, 1 Drawing Sheet

METHOD OF ESTIMATING A DISTANCE

Figure 1:
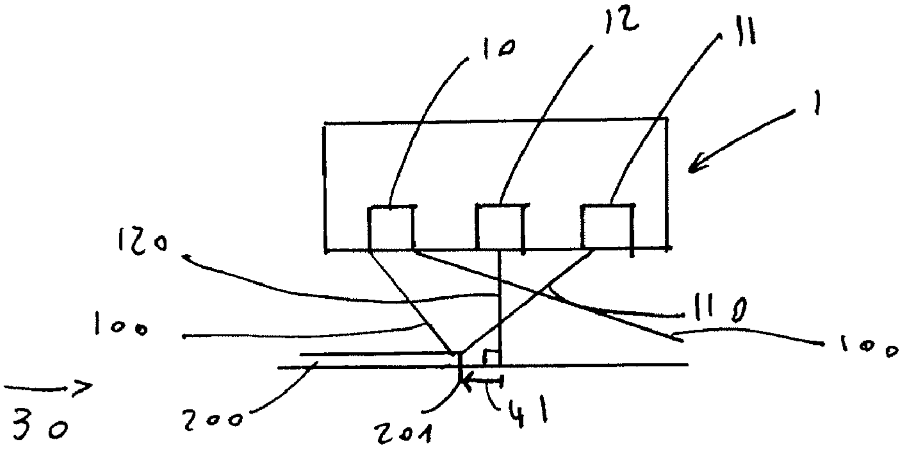

This application is the National Phase of PCT/EP2005/053410, filed Jul. 15, 2005. The contents of the foregoing application is incorporated by reference in its entirety.

The present invention relates to a method of estimating a distance using an optical sensor. Such an estimate is for example of use in the field of printers, whereby the measurement of distance to a printing medium allows increasing the printing quality.

The use of optical sensors to estimate a distance has for example been disclosed in US2005/0078134. The estimation is in this case based on a ratio between two output signals produced by two spaced light receptors.

The object of the present invention is to provide a method of estimating a distance to a surface which would be substantially independent of the type of surface considered.

This object is achieved in a first aspect of the invention by a method of estimating a distance to a surface, whereby an emitter emits light towards a surface, at least some light being reflected by the surface, the surface comprising a detectable feature, the reflected light being received by a first receptor and by a second receptor, the surface being in movement relative to the receptors, the first and the second receptor receiving the light reflected at a first and at a respectively second angle thereby producing a first and a respectively second dataset, each dataset including data representing said feature, the first and the second angle being different, whereby the distance is estimated using the first and the second dataset.

It should be noted that the fact that the first and the second receptor are receiving the light reflected at a first and at a respectively second angle should in all aspects of this invention be understood as the first and the second receptor are only receiving the light reflected at a first and at a respectively second angle, meaning that incident light on a receptor of the invention will be received only if the angle of incidence corresponds to the specific angle of incidence of the receptor concerned. Each receptor according to the invention is indeed built, for example using lenses, to receive incident light associated to a particular angle. It should be understood that as any real system, the angle is in fact a narrow range of angles forming a cone having a narrow aperture and centered on the actual angle. This means that the angles according to an embodiment of the invention are defined with a precision of plus or minus 3 degrees, so that an angle of for example 45 degrees corresponds to a range of from 42 to 48 degrees. In another embodiment, the angles according to the invention are defined with a precision of plus or minus 5 degrees, so that an angle of for example 45 degrees corresponds to a range of from 40 up to 50 degrees. As a default, the angles in the invention are defined according to a virtual line or plane normal to the surface of the invention.

In an embodiment according to the first aspect, the surface is the upper surface of a printing medium. The feature may be an edge of the printing medium. The feature may also be printed on the printing medium. The emitter, the first and the second receptors may be located on a printhead carriage.

In an embodiment according to the first aspect, the method is part of a method of estimating the thickness of a medium. The method may be optimized to measure a thickness comprised in the range of 0.1 to 2 mm with a resolution of less than 0.2 mm. The method may be optimized to measure a thickness comprised in the range of 0.1 to 2 mm with a resolution of less than 0.1 mm.

This object is achieved in a second aspect of the invention by a method of estimating the thickness and the glossiness of a medium, whereby the thickness and the glossiness are both determined using a single optical sensor.

In an embodiment according to the second aspect, the optical sensor is used for a printer calibration process other than estimating the thickness and the glossiness of a medium.

In an embodiment according to the second aspect, the optical sensor comprises an emitter and at least a first and a second receptor. The first and the second receptors may receive a light incident at a first, respectively second angle, whereby the first and the second angle differ by a value of at least 30 degrees.

In an embodiment according to any aspect of the invention, the first receptor is a specular light receptor.

In an embodiment according to any aspect of the invention, the second receptor is a diffuse light receptor.

In an embodiment according to any aspect of the invention, the emitted light is emitted at an angle substantially equal to the first angle.

This object is achieved in a third aspect by a calibration method whereby the thickness of a printing medium is linked to a first and to a second output, the first output being the output of a first optical receptor, the second output being the output of a second optical receptor, the first optical receptor receiving light at a first angle, the second optical receptor receiving light at a second angle, the first and the second angle being different.

In an embodiment according to the third aspect, the link is provided by scanning the surface of a medium having a known thickness, the surface comprising a detectable feature, the feature being scanned and detected by the first and by the second optical receptor.

In an embodiment according to the third aspect, the first output and the second output have a similar profile, the first and the second output being shifted, the calibration method comprising an evaluation of the shift between the first and the second output.

In an embodiment according to the third aspect, a function is built comprising a linear function relating the shift to the thickness.

In an embodiment according to the third aspect, the first and the second output are in the form of a first and respectively second dataset.

In an embodiment according to any aspect of the invention the method is part of a printer calibration procedure.

Figure 2:
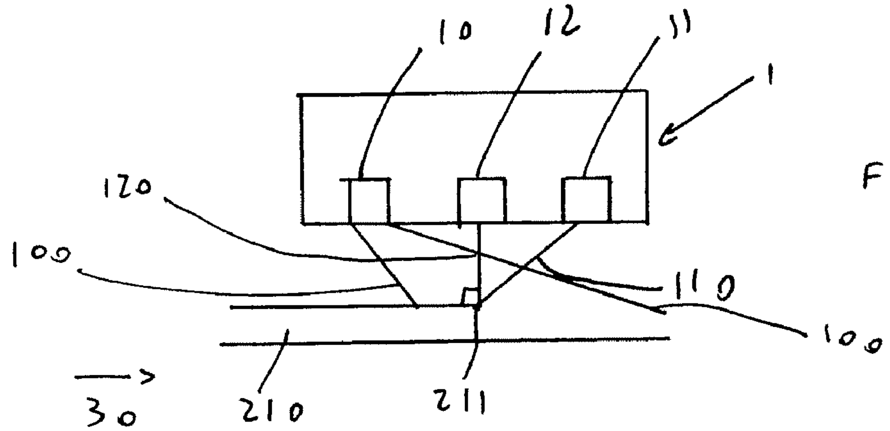
Figure 3:
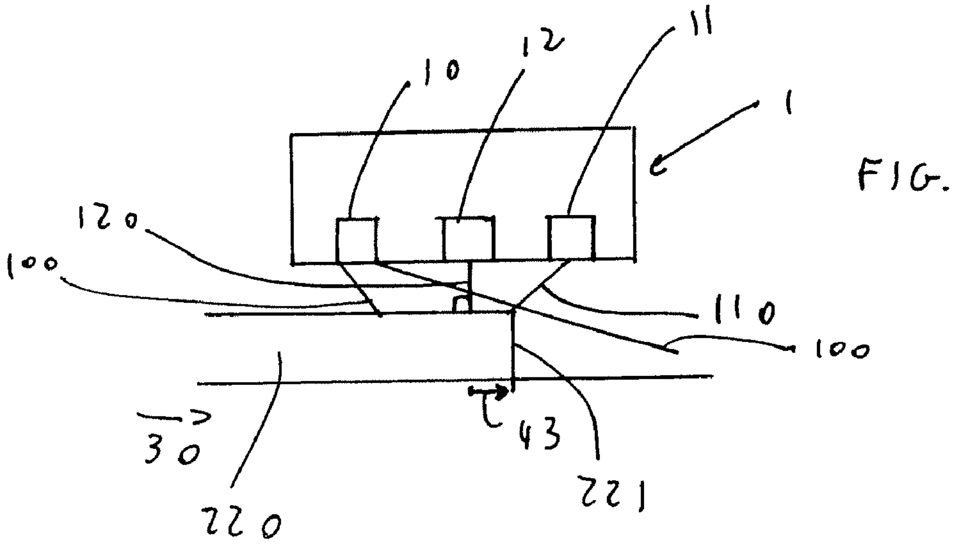

The invention is elucidated by reference to an embodiment in conjunction with FIGS. 1 to 3.

FIGS. 1 to 3 are diagrams of a system operating according to a method of the invention.

In FIGS. 1 to 3, an optical sensor 10 is represented. The sensor 1 is provided with a light emitter 10, a first 11 and a second 12 light receptor.

In this embodiment, the first light receptor 11 is a specular light receptor, meaning that the receptor 11 receives light emitted at a 45 degrees angle to the surface lying in front of the receptor. It should be understood that the 45 degrees angle is meant with some tolerance, as the receptor is a physical system. The receptor receives in fact light emitted in a cone centered on the 45 degrees angle axis, the cone having preferably a narrow aperture. In this embodiment, this is achieved using optical means, more particularly lenses. The direction of the emitted light "seen" by the specular receptor 11 is represented as a line 110.

In this embodiment, the second light receptor 12 is a diffuse light receptor, meaning that the receptor receives light emitted at a 90 degrees angle with the aperture of the receptor. It should be understood that the 90 degrees angle is meant with some tolerance, as the receptor is a physical system. The receptor receives in fact light emitted in a cone centered on the 90 degrees angle axis, the cone having preferably a narrow aperture. In this embodiment, this is achieved using optical means, more particularly lenses. The direction of the emitted light "seen" by the diffuse receptor 12 is represented as a line 120. The right angle of 90 degrees is also represented in the figure in the conventional manner.

In this embodiment, the light emitter 10 emits a cone of light 100 in a general direction of 45 to the surface opposite the emitter.

In FIG. 1, a thin sheet of paper is 200 is represented, the sheet having an edge 201. The sheet is being moved in the direction represented by the arrow 30. The sheet 200 is represented at the moment when the edge 201 is detected by the specular receptor 11. The edge 201 of the sheet 200 will be detected by the diffuse receptor at a later stage in the process when the sheet 200, moving in the direction of arrow 30, will cross the line 120. It should be noted that an analysis of the datasets produced by the receptors 11 and 12 will show a shift in the diction of the edge 201, the shift being represented by the arrow 41.

In FIG. 2, a sheet 210 thicker than the sheet 200 is represented, having an edge 211. The sheet 210 is represented at a position where the edge 211 is aligned both with lines 110 and 120. This means that in this configuration, when scanning with both receptors 11 and 12 during movement of the sheet 210 in the direction of arrow 30, an analysis of the datasets produced by both receptors will show a detection of the edge 211 at the same moment. There is no shift in this situation.

In FIG. 3, an even thicker sheet 220 is represented with its edge 221 intersecting the line 110 of receptor 11. In this position, the edge was already detected by receptor 12, whereby the edge 221, the sheet 220 moving in the direction of the arrow 30, intersected line 120 beforehand. In this case, the analysis of the datasets produced by both receptors will show detection of the edge 221 shifted in the direction opposite to the shift of FIG. 1. This is represented by the arrow 43, which may be compared to the arrow 41.

As elucidated in FIGS. 1 to 3, the distance between the detectable feature (in this embodiment the edge 201, 211 or 221) and the sensor is directly related to the first and the second dataset, the first and the second data set representing the detectable feature. In this particular embodiment, the surface is the upper surface of a sheet of paper, which is a printing medium. It should be noted that the detectable feature may be of a different nature, for example printed on the sheet of paper. In another embodiment of the invention, the top surface of the sheet of paper is white and a black or colored line is printed in a direction non parallel to the direction of movement between the surface and the receptors. In another embodiment, the line is perpendicular to the direction of movement. In another embodiment, a series of lines is printed instead of a single line, in order to obtain a plurality of measurements in order to improve the accuracy of the estimate.

In an embodiment of the invention, the emitter, the first and the second receptors are located on a printhead carriage. The invention is indeed applicable to the field of printing, where the knowledge of the distance between the surface to be printed and the actual printhead allows optimizing the printing quality by improving the dot placement precision. In the case where the printhead is placed on a carriage which moves back and forth in a direction perpendicular to the direction of movement of the printing medium, a sensor comprising the emitter and the receptors of the invention is advantageously located on the carriage together with the printhead. The invention may be used to adjust the distance between a printhead and a printing medium to avoid the printhead crashing into the printing medium. The actual carriage height may be selected depending from the printing medium thickness, as well as from its glossiness.

In an embodiment of the invention, the method is part of a method of estimating the thickness of a medium. When applied to the field of printing, if the printing medium is placed on a printing platen, the distance between the sensor and the platen being known, the thickness of the medium may be deduced by subtraction of the distance between the sensor and the surface to the distance between the sensor and the platen.

In an embodiment of the invention, the method is optimized to measure a thickness comprised in the range of 0.1 to 3 mm with a resolution of less than 0.2 mm. It should be noted that the resolution was found to be related to the difference between the first and the second angle, in so far as the closer the first and the second angle will be, the worse the resolution will become. In an embodiment of the invention, the method is optimized to measure a thickness comprised in the range of 0.1 to 2 mm with a resolution of less than 0.1 mm.

The system illustrated in FIGS. 1-3 permits putting a method according to the second aspect of the invention into practice. The assembly comprising the first, the second receptor and the emitter forming the single optical sensor according to the second aspect of the invention. In this embodiment, the method of determining the thickness is as explained above, while the glossiness determination is based on the ratio between the output of the first receptor and the output of the second receptor. A glossy surface will indeed present an important specular reflection and a reduced diffuse reflection while a non-glossy surface will present a higher diffuse reflection and a lower specular reflection. The combination of both measurements of thickness and glossiness using the same sensor is economical and allows a relatively complete characterization of a printing medium if the invention is used in the printing field. Such an automatic characterization of a printing medium allows optimizing the printing quality without depending on a user.

It should be noted that the invention may permit protecting the printer and making its operation more reliable by actively avoiding printing medium crashes by optimizing the printhead to printing medium distance for optimum quality and low risk of printing medium crash.

The same sensor may also be used for a printer calibration process other than estimating the thickness and the glossiness of the medium. Such processes would include any one or any combination of the following: pen alignment, media advance calibration, media edge detection, paper skew measurement, presence of replaceable service station cartridges, positioning of specific parts in the printer, service station position or zero mark in an encoder. Such a multiple use of the sensor is economical.

In an embodiment, the light emitted is emitted at an angle substantially equal to the first angle. In an embodiment, the emitting angle and the first angle are of 45 degrees, as illustrated in FIGS. 1 to 3.

In an embodiment, the first and the second receptors are receiving a light incident at a first, respectively second angle, whereby the first and the second angle differ by a value of at least 30 degrees.

A calibration method according to the invention is illustrated in FIGS. 1 to 3, whereby the thickness of the sheet 200 is linked to the shift 41, the thickness of the sheet 210 is linked to a shift of zero and the thickness of the sheet 220 is linked to the shift 43. By scanning a plurality of sheets having a known thickness, collecting the data produced by the first and the second receptors in order to deduce the shift corresponding to each thickness, a linear function may be built relating the shift to the thickness. In an alternative, a reference table may be used. In an embodiment, such a calibration procedure is part of a printer calibration procedure, the function or the table being kept in a memory of the printer, whereby the thickness of the printing medium used may be estimated based on the value found in the table or returned by the function for the corresponding shift. Such a calibration method may be repeated several times during the life of the printer to compensate possible variations of the system, preferably using a specific type of printing medium.

The invention claimed is:

1. A method of estimating a distance to a surface, comprising: an emitter emitting light towards a surface, at least some light being reflected by the surface, the surface comprising a detectable linear feature, wherein the surface is an upper surface of a printing medium and the feature is an edge of the printing medium; receiving the reflected light by a first receptor and by a second receptor, the surface being in movement relative to the receptors, the first and the second receptor receiving the light reflected at a first and at a respectively second angle; and producing a first and a respectively second dataset, each dataset including data representing said feature, the first and the second angle being different, whereby the distance is estimated using the first and the second dataset.

2. A method according to claim 1, whereby the feature is printed on the printing medium.

3. A method according to claim 1, whereby the emitter, the first and the second receptors are located on a printhead carriage.

4. A method according to claim 1, whereby the method is part of a method of estimating the thickness of a medium.

5. A method according to claim 4, whereby the method is optimized to measure a thickness comprised in the range of 0.1 to 2 mm with a resolution of less than 0.2 mm.

6. A method according to claim 1, whereby the first receptor is a specular light receptor.

7. A method according to claim 1, whereby the second receptor is a diffuse light receptor.

8. A method according to claim 1, whereby the emitted light is emitted at an angle substantially equal to the first angle.

9. A calibration method whereby the thickness of a printing medium is linked to a first and to a second output, comprising: outputting the first output from a first optical receptor, and the second output from a second optical receptor; the first optical receptor receiving light at a first angle for estimating the thickness of the printing medium; the second optical receptor receiving light at a second angle for estimating the thickness of the printing medium; wherein the first and the second output are shifted, and evaluating the shift between the first and the second output, whereby a function is built comprising a linear function relating the shift to the thickness; and wherein the first and the second angle are different.

10. A method according to claim 9, whereby the link is provided by scanning the surface of a medium having a known thickness, the surface comprising a detectable feature, the feature being scanned and detected by the first and by the second optical receptor.

11. A method according to claim 9, whereby the first output and the second output have a similar profile.

12. A method according to claim 9, whereby the first and the second output are in the form of a first and respectively second dataset.

13. A method according to claim 9, whereby the method is part of a printer calibration procedure.

14. A system for estimating a distance to a surface, comprising: an emitter configured to emit light towards a surface, at least some light being reflected by the surface, the surface comprising a detectable feature, wherein the surface is an upper surface of a printing medium and the detectable feature is an edge of the printing medium; and a first receptor and a second receptor, the first and second receptors configured to receive the reflected light, the surface being in movement relative to the first and second receptors, the first and second receptors receiving the light reflected at a first and at a respectively second angle thereby producing a first and a respectively second dataset, each dataset including data representing the feature, the first and second angles being different, whereby the distance is estimated using the first and second datasets.

15. A system according to claim 14, whereby the surface is the upper surface of a printing medium, the feature is an edge of the printing medium, and the feature is printed on the printing medium.

16. A system according to claim 14, whereby the emitter and the first and second receptors are located on a printhead carriage.

17. A system according to claim 14, whereby the system is configured to estimate the thickness of a medium.

* * * * *